Feb. 7, 1939. M. TODD 2,146,386
DISPLAY, ADVERTISING, AND PROPAGANDA DEVICE
Filed July 28, 1938
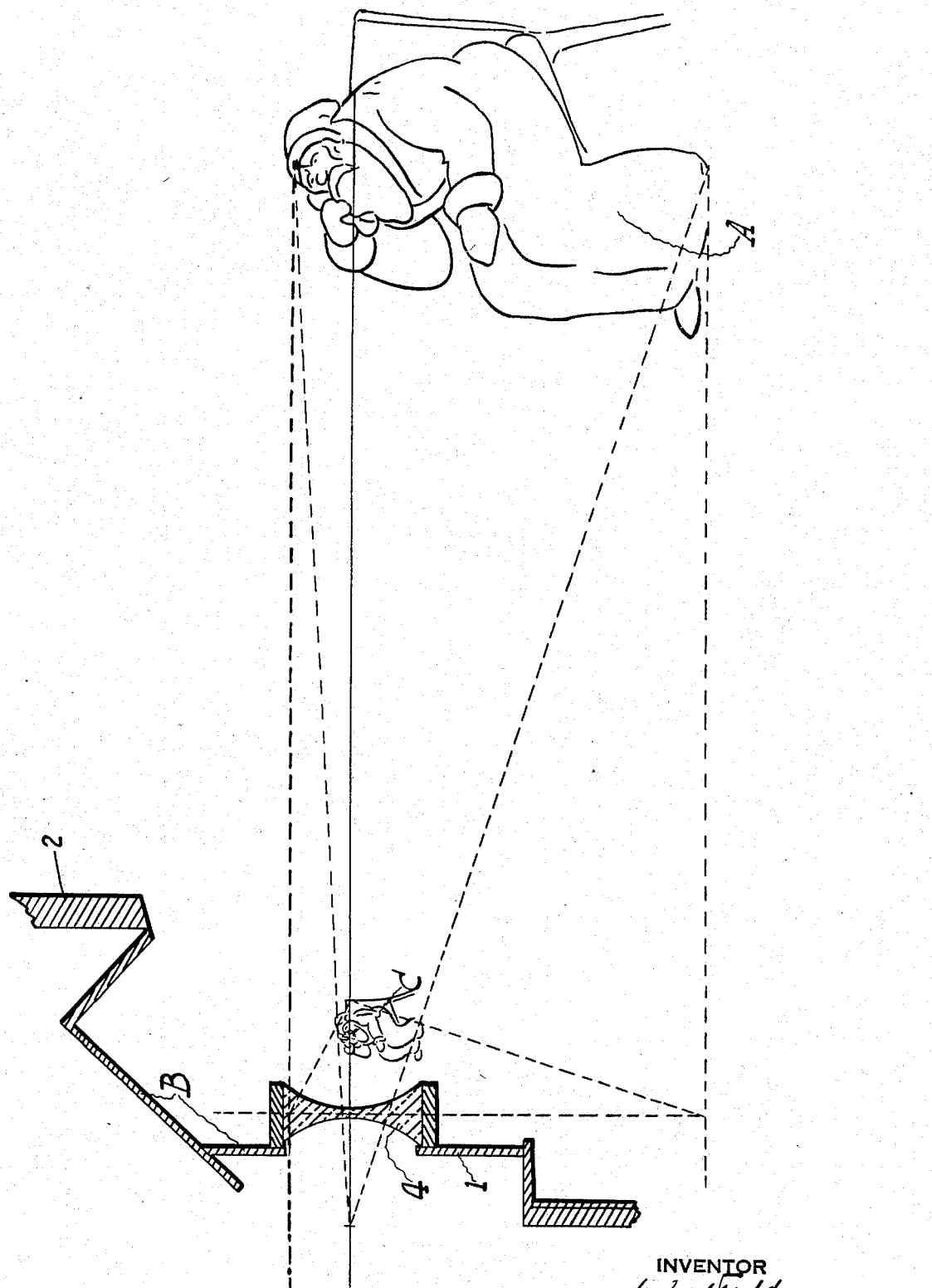
INVENTOR
Michael Todd
BY J. Friedman
ATTORNEY Patented Feb. 7, 1939

2,146,386

UNITED STATES PATENT OFFICE 2,146,386

DISPLAY, ADVERTISING, AND PROPAGANDA DEVICE

Michael Todd, New York, N. Y., assignor to Yermie Stern Commercial Attraction, New York, N. Y.

Application July 28, 1938, Serial No. 221,818

1 Claim. (Cl. 272—8)

The invention relates to a display, advertising and propaganda device; its attraction creating property is mainly based on the specific and individual utilization of a known optical illusion producing method.

It is the object of the invention to manufacture a device of the named type which can be easily adapted to special, for instance seasonal advertising and propaganda requirements and variations without departing from the present utilization of the known illusion creating principle.

It is a further object of the invention to create a device for establishing and carrying out a propagandistic activity by the application of typical figures, for instance historical figures, figures from fairy-tales and the like in combination with the mentioned illusion creating principle.

It is a further object of the invention to produce a device which is particularly adapted to excite the attention and the interest of the customers of department stores or similar establishments.

It is a further object of the invention to particularly act on the imagination of children and to awaken their interest by displaying moving and operating dummy figures.

The illusion creating method used in connection with this invention is based on the application of suitable optical means particularly a lens, by means of which the movements and the actions of a person may be transmitted as a phantom image to any desired place and at the same time may be reduced to any desired size.

In the known devices for the practical application of this principle the lens only serves the purpose of creating the phantom image.

The present invention is differentiated from the known devices by the essential fact that the lens besides its optical action serves as a functional element of the display device itself and forms an operating part of same.

With the aforesaid objects in view the invention is in the following description exemplified as a displaying, advertising and propaganda apparatus for Christmas, the typical figure of Santa Claus or Kris Kringle being shown performing his activities in a snow-covered house which is set up in a winterly landscape.

The drawing forming part of this specification illustrating this embodiment of the invention shows a partial vertical section of the house, which is set against an opening in a wall 2 of the building in which the device is displayed.

The person or other object which is to be shown as a phantom image and in the present exemplification of the invention takes the figure of Santa Claus sitting in his workshop behind the window 4 is indicated as A. The window, through which the observers look into Santa Claus' workshop is located in the front-wall 1 of the toy or dummy house B. This window at the same time comprises the lens of the optical system which produces the phantom person C of Santa Claus within the house B.

It is apparent that the lens 4 apart of its optical function as an illusion creating device forms in the present case an operating element of the display device namely a window of the dummy house B, within which the workshop of Santa Claus is located. Instead of entirely replacing the window by the lens 4 as shown in the drawing the latter may also be used in combination with a glass window, in which case the latter may be located directly in front of the lens, the latter for instance having a semi-concave shape.

It is understood that the device shown represents one embodiment of the invention only.

Instead of a house any other suitable encasing may be used in order to enclose and characterize the phantom image of the person or object chosen in connection with the specific displaying or advertising problem in question.

I claim:

An advertising device comprising a miniature house set in front and against an opening of a wall, a lens creating within said house the reduced image of a person acting behind the wall, said lens being a part of the window inserted in a wall of said house.

MICHAEL TODD.